Aug. 22, 1967     J. M. JACKSON, JR     3,336,696
PLASTIC FLORIST'S MESH
Filed June 24, 1965
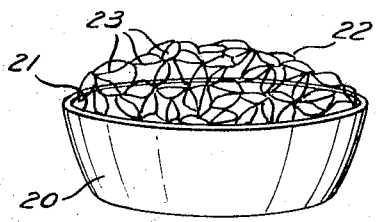
Fig. 1
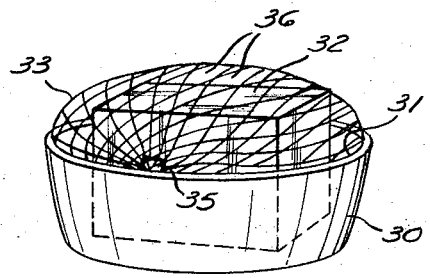
Fig. 2
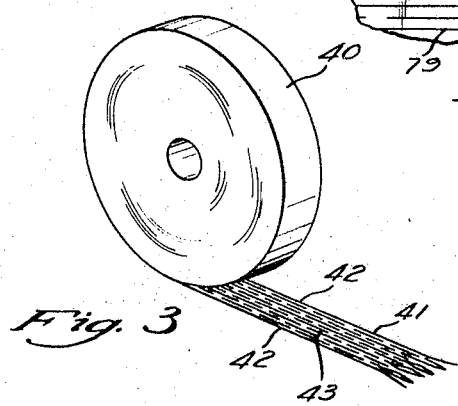
Fig. 3
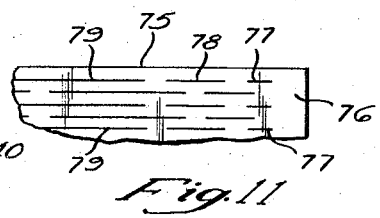
Fig. 11
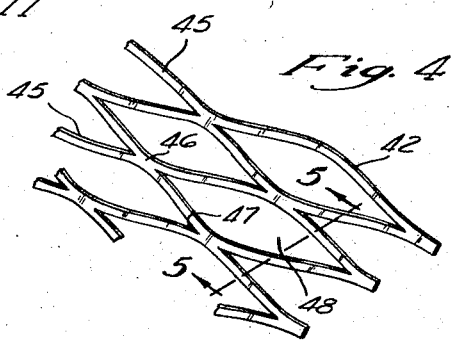
Fig. 4
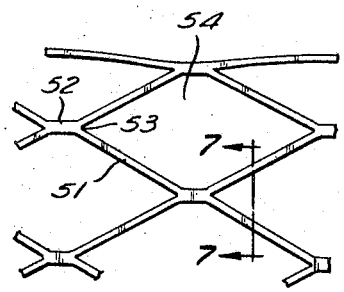
Fig. 6
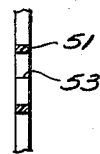
Fig. 7
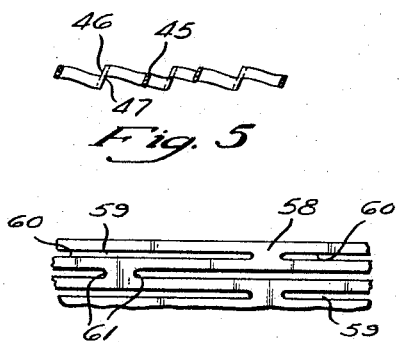
Fig. 5 / Fig. 8
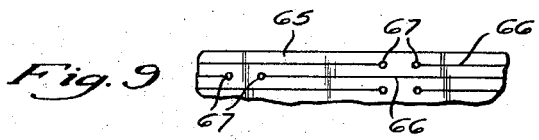
Fig. 9
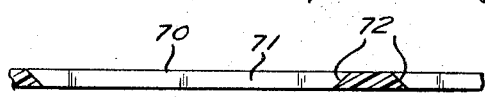
Fig. 10
INVENTOR.
JAMES M. JACKSON JR.
BY McNENNY, FARRINGTON, PEARNE & GORDON
ATTORNEYS

3,336,696
PLASTIC FLORIST'S MESH
James M. Jackson, Jr., Akron, Ohio, assignor to The Smithers Company, Kent, Ohio, a corporation of Ohio
Filed June 24, 1965, Ser. No. 466,671
7 Claims. (Cl. 47—41.1)

This invention relates generally to materials for making floral arrangements and more particularly to an expandable plastic mesh particularly suited to be used by florists for applications previously employing the metal mesh commonly known as chicken wire.

Florists have long used a wire mesh having openings of approximately one inch and of the type known as chicken wire as an aid in assembling flowers into floral arrangements. This material has been used because the small diameter of the wire allows the material to be easily bent into a desired shape while leaving relatively openings through which flower stems may be passed. For example, a piece of mesh may be wadded up into a ball and placed into a dish or bowl and held in place by a wedging action while leaving a large number of openings through which flowers may be inserted so that the chicken wire supports the flowers in a desired position while leaving an open space so that the dish may be filled with water. Chicken wire has found many other uses for a support, such as in a trellis like arrangement, and it may be easily painted an attractive color such as green, to make it blend in with the arrangement.

Another use of chicken wire has been found with the more recent development of plastic foam materials for supporting flower stems. These foam materials are generally available in block form, and chicken wire is often used to retain the blocks in position within a container, as well as to support water filled blocks of foam material in other positions to take advantage of the "non-spillable" characteristics of these plastic foams.

However, the use of ordinary metal chicken wire has a number of disadvantages. The first is, that being commonly made of iron or steel wire, and due to its small diameter, it quickly rusts and loses its strength after only a short contact with water. Furthermore, the fine diameter of the wire, necessary for low cost and flexibility has the disadvantage that it may cut the floral arranger's fingers during handling, as well as cut the foam material and flower stems if a stem should press directly against the mesh wire. Furthermore, the material is bulky to store because it usually comes on large and wide rolls which require the use of special cutters to cut a piece of the desired shape. Furthermore, the cut pieces have sharp end wires at the cut edges which likewise present a dangerous feature during handling.

It is therefore a principal object of this invention to provide a novel plastic mesh material which is suitable for use by florists in the same manner and for the same purposes as metal chicken wire.

It is a further object of this invention to provide a novel plastic mesh having the wide mesh openings of chicken wire while having strands of large diameter which have no sharp edges tending to cut either the user's hands, plastic foam, or flower stems.

It is a further object of this invention to provide a novel plastic mesh as set forth in the preceding objects which is light in weight and may be expanded into shape by the user as required so that it may be sold in a relatively narrow roll which allows the user to cut off a strip of the desired length and by stretching it sideways expand it into the finished mesh.

It is a further object of this invention to produce a plastic mesh as set forth in the preceding object in which the plastic material while being relatively flexible may be expanded by deforming portions of the material beyond its elastic limit and retain a dimensional stability with a minimum tendency to spring back after it has been formed to the desired shape.

It is a further object of this invention to provide a plastic mesh as set forth in the preceding objects which has high strength while retaining an attractive appearance and color.

Further objects and advantages of this invention relating to low cost manufacture, durability, and ease of use, among others, will readily become apparent to those skilled in the art upon a more complete understanding of the invention as set forth in the following description and as shown in accompanying drawings in which:

FIGURE 1 is a perspective view showing the plastic mesh of this invention arranged in a bowl for supporting flowers;

FIGURE 2 is a perspective view of the plastic mesh according to the preferred embodiment of this invention arranged for holding a block of plastic foam in place in a bowl;

FIGURE 3 is a perspective view of the roll of plastic material before it is expanded into the opened mesh;

FIGURE 4 is a perspective view of the plastic mesh according to one embodiment of this invention;

FIGURE 5 is a cross-sectional view taken on line 5—5 of FIGURE 4;

FIGURE 6 is a plan view of the plastic mesh according to another embodiment of this invention;

FIGURE 7 is a cross-sectional view taken on line 7—7 of FIGURE 6;

FIGURE 8 is a fragmentary plan view of the unexpanded mesh according to another embodiment of this invention;

FIGURE 9 is a fragmentary plan view of the unexpanded mesh according to still another embodiment of this invention;

FIGURE 10 is a longitudinal cross-sectional view showing the cutting of the slits according to still another embodiment of this invention; and FIGURE 11 is a fragmentary plan view of the unexpanded mesh according to another embodiment of this invention.

Referring now to the figures in greater detail, FIGURE 1 shows an application of the plastic mesh according to this invention. A typical floral arrangement uses a bowl 20 having an open interior 21 which is filled with a wadded piece of the plastic mesh 22. This mesh is crumpled together in to a generally ball-shaped object so as to substantially fill the bowl and by the wedging action against the sides hold the mesh in place within the bowl. It is important that the mesh not be wadded so tightly as to block off the openings 23 formed by the mesh through which the flower stems are inserted so that their ends are immersed in water contained within the interior 21 of the bowl.

FIGURE 2 shows another application of this invention in which a dish or bowl 30, which may be made of either a rigid material such as china or glass or papier-mache, has an interior 31 within which is fitted a block 32 of plastic foam. In use, to avoid the presence of any water which might spil, the block of plastic foam 32 is first fully saturated with water and then placed within the dish 30, after which a sheet of plastic mesh 33 is placed over the block of foam and held in place in a suitable manner, such as by staples 35 in the case of a papier-mache dish. In this application, the plastic mesh 33 serves to hold the block of foam 32 securely in place and provides additional support for the flower stems which are then inserted through the mesh openings 36 into the block of foam. This arrangement is particularly helpful in the case of heavy and coarse stemmed flowers, since they may then be arranged to rest against the sides of the openings 36 for additional support beyond that provided by the block of foam alone.

An important feature of the invention is shown in FIGURE 3 which shows the material as it is customarily received and stored by a florist prior to use. The mesh is unexpanded and in the form of a relatively narrow strip of uniform thickness so that it may be rolled up in a coil or roll 40 so that a large amount of material may be stored in a compact space. When the florist intends to use the mesh, he unrolls the end 41 of the roll 40 and cuts off a piece of the necessary length. As shown, the strip has parallel sides 42 and slits 43 parallel to the sides. These slits are staggered in alternating fashion so that every other slit is in the same position along the length of the strip and the intermediate ones are offset by half the length of a slit. Thus, the florist takes the cut piece and by holding the sides 42 and spreading them apart, the piece opens out so that the slits form the openings of the mesh as shown in greater detail in FIGURE 4.

An important feature of this invention is that when the mesh is opened up, the plastic will be deformed beyond its elastic limit at the ends of the slits so that it will retain substantially the position and shape into which it is forced without springing back in a resilient or elastic manner. It has been found that one of the most suitable materials for this purpose in terms of physical properties and low cost is a polyethylene of the high density or high modular type in which there is a considerable amount of random cross-linking of the molecules which avoid any particular orientation of the molecules and reduces the resiliency so that the material, while being relatively hard and strong may still be deformed by the bending action involved in expanding the mesh. In a typical application, the strip of plastic material, before expansion, may be made about .020 inch thick and about 1 inch wide. The slits are then spaced apart by about .040 inch. These slits then according to the preferred embodiment will have the length of about 1⅞₆ inches and the slits are spaced apart along their length by a distance of approximately 3/16 inch. These slits may be cut by intermeshing revolving discs having interrupted portions corresponding to the longitudinal spaces between the slits, so that the discs shear the strip between adjacent discs as the strip is fed, after which the slit strip is rolled up into the roll 40.

When the material as shown in FIGURE 3 and having the above dimensions is expanded, it will generally assume the shape shown in FIGURE 4. Thus, the strands 45 formed between the adjacent slits have a cross-sectional size of .020 inch by .040 inch and the junctions 46, will then be approximately 3/16 inch between the slit ends 47 and of a width equal to twice the width of a strand or .080 inch. While the material may be expanded a considerable distance to distort the openings 48, generally the mesh will be formed so that the openings and the mesh have the general shape as shown in FIGURE 4. In such case, the width of the mesh may be increased by a factor of up to 15 times or more, particularly if the slits are increased in length, so that the total width of the strip of expanded mesh may be as much as 15 inches. Of course, this causes a slight foreshortening of the mesh, but such may be compensated for according to the length cut from the roll.

It is to be noted that as shown in FIGURE 5, that when the strands have the dimensions given above, the expansion causes them to turn laterally as shown in FIGURE 5 so that the strands 45 and junctions 46 are generally inclined at a rather high angle to the general plane of the mesh. This arrangement tends to reduce the strain at the junctions 46 and the slit ends 47 so as to inhibit tearing of the mesh at these points.

Another embodiment of the mesh is shown in FIGURES 6 and 7. In this case, the strip of material chosen to have a greater thickness, for example .040 inch, and the slits are spaced closer together laterally so that the width of the strands may be made for example .020 inch so that the strands are thicker than they are wide. In this case, the strands 51 and junctions 52 will remain flat as shown in FIGURE 7 and the slit ends 53 will remain substantially perpendicular to the plane of the mesh. This narrower arrangement of the strands 51 allows more slits to be made in a given width of material so that more openings 54 may be formed when the material is expanded and it may therefore be expanded to a greater width.

In the embodiments of FIGURES 4 and 6, the slits have been shown as being knife slits having no substantial width and therefore sharp ends which tend to concentrate the stress when the mesh is expanded, which may increase the tendency for the strands to tear through at the junctions. To alleviate this problem, it is possible to make the ends of the slits rounded so as to reduce the tendency of stress concentration presented by the sharp V-shape of the slit ends in FIGURES 4 and 6. As shown in FIGURE 8, this may be accomplished by having the strip 58 perforated by means of slots 59 having sides 60 spaced apart by the actual cutting out of some of the material of the strip. The slots 59 may then be made with rounded ends 61 so that the slots 59 are therefore in shape of an elongated oval.

Another arrangement providing rounded ends for the slots is shown in FIGURE 9 in which the strip 65 is provided with knife slits 66 in the same manner as in the embodiments of FIGURES 4 and 6. However, the ends of the slits 66 instead of being left sharp are made rounded by the punching of holes 67 through the strip to give a keyhole shape to the slits 66.

Another solution to the problem of strengthening the strip at the junctions is shown in FIGURE 10 in which the strip 70 is provided with slits 71 of the knife type as shown in FIGURES 4 and 6. However, to provide more material at the junctions 73, the slits are made shorter on one side so that the slit ends 72 are inclined, so that the junctions are trapezoidal in cross-section, as shown in FIGURE 10. When this is used with the embodiment in which the strands are made wider than they are thick, as shown in the embodiment of FIGURE 4, the slanted ends 72 of the slits 71 do not interfere with the expansion of the material so that the junctions have an effective length only as long as the shortest dimension of the junction. However, because of the angle, the effective length of the junction for purposes of strength is made greater so that the result is a mesh having a greater effective length of the junction for strength purposes without the corresponding increase in the coarseness in the mesh and enlarging of the size of the openings.

The embodiments described above allow the mesh to be expanded to a maximum useful width, the extent of which depends on the length of the slits. In order to make special shapes for the net, it can be brushed together to reduce the width, or if desired, not be deformed by expansion at certain places. Another arrangement for controlling width is shown in FIGURE 11 where the strip 75 is provided with an end in the form of a solid band 76 without any slits so that this portion of the strip cannot expand. Adjacent the band 76, the slits are shortened, as at 77, and the slits are made progressively longer, as at 78, away from the band, with the slits some distance away at 79 having the full length. It will be seen that the band 76 cannot expand, and since expansion is proportional to slit length, the expansion will gradually increase to full width. Of course, the band 76 may be placed in the width of the strip and rejected at intervals, or it need not be present so that the slits are merely shortened at intervals along the strip. The result of this variation in slit length will produce a scalloped effect for the expanded mesh and can be arranged as desired to give effects such as bows and the like to the expanded mesh.

It is to be noted that although high density polyethylene is preferred material for the web, other ductile plastic materials may be used such as polyproplyene, polyethylene copolymers, and plasticized vinyl polymers and copolymers. These materials may be colored with a dye material prior to the forming and slitting of the roll so that the material is colored all the way through and any accidental breakage of the strand will not cause the change in color of the mesh. Furthermore, such materials may readily be made to take paint sprays of the types commonly used by florists and thus may be colored any color desirable for decorative purposes. Because such colors may be incorporated directly in the plastic they will not chip or fade and the material will retain color with a high degree of permanence. With the arrangement, the strands have an effective diameter considerably greater than that of chicken wire, so that there is a greatly reduced tendency of the strands to cut the user's hands or a block of foam material or cause damage to the flower stems. However, such strands are still relatively small in comparison to the dimensions of the openings therebetween so that the mesh does not interfere with the insertion of flowers into a block of plastic foam, as for example, is done in the arrangement shown in FIGURE 2. Likewise, the plastic is unaffected by the presence of water so that it will not rust, become weakened, or discolor and may lend itself to reuse if desired without damage or loss of physical properties.

Although several embodiments of this invention have been shown in the drawings and described in detail here and above, it is recognized that upon a full understanding of the invention, various additional modifications and rearrangements will readily occur to those skilled in the art and may be resorted to without departing from the scope of the invention as set forth in the following claims.

What is claimed is:

1. A florist's mesh comprising a strip of flexible deformable plastic material of uniform thickness having a pair of sides, a plurality of staggered closed slits extending longitudinally of said strip and parallel to each other in alternating overlapping array, the lateral width between adjacent slits being uniform throughout the length of the strip, the longitudinal spacing between said slits being substantially uniform throughout the length of the stirp, said strip having a plurality of zones along the length thereof with each of said zones extending over substantially the entire lateral width of said strip, the length of said slits in succeeding zones being progressively smaller with all of the slits in each zone being of the same length to allow said strip to be expanded by moving said sides laterally apart to plastically deform said material beyond its elastic limit at the portions adjacent the ends of the slits to produce an open mesh having staggered generally diamond-shaped openings corresponding to said slits and having a size of opening and width between the sides of the expanded mesh generally proportional to the length of the slits at their respective zones.

2. A florist's mesh according to claim 1 including additional zones along the length of said strip interspacing the aforesaid zones in which said additional zones are without slits to define a continuous unslit band across the width of the strip between said sides whereby said strip at said band cannot be expanded by lateral movement of the sides when the remaining zones are expanded.

3. A florist's mesh comprising a sheet of flexible deformable plastic material of uniform thickness having a plurality of regularly spaced staggered closed slits extending parallel to each other in alternating overlapping array to define strands of said material, said slits have a greater length on one side of the sheet than on the other side so that the slit ends are inclined to the plane of the sheet, said slits being arranged in length and lateral spacing to allow said sheet to be expanded by moving said strands laterally apart to plastically deform said material beyond its elastic limit at the junction portions of said strands adjacent the ends of the slits to produce an open mesh having staggered generally diamond-shaped openings defined by said strands.

4. A florist's mesh as set forth in claim 3 wherein said sheet is of a high density polyethylene material of uniform thickness and the relative length of said slits and said junctions between adjacent longitudinally aligned slits is such that said sheet can be expanded laterally of said slits at least ten times the lateral width of said junctions.

5. A florist's mesh comprising a sheet of flexible deformable plastic material having a plurality of regularly spaced, staggered closed parallel slits arranged over substantially the entire surface area of said sheet, adjacent slits being spaced apart longitudinally a distance substantially less then their length to define junctions and being spaced laterally to define strands, the relative length of said slits and said junctions between adjacent longitudinally aligned slits being such that said sheet can be expanded laterally of said slits at least ten times to plastically deform the material of said sheet beyond its elastic limit at said junctions to produce an open mesh with staggered generally diamond shaped openings having substantially linear sides defined by said strands, and the width of said strands being greater than the thickness of said material whereby when said sheet is expanded laterally of said slit said junctions become inclined to the general plane of said mesh.

6. A florist's mesh according to claim 5 wherein each of said slits is provided with an enlarged rounded opening at each end thereof.

7. A florist's mesh according to claim 5 wherein each of said slits is oval with parallel longitudinal sides spaced laterally apart from one another and terminating in rounded side portions at each end of said slit to minimize the tearing of said material at said junctions when said junction material is plastically deformed beyond its elastic limit.

References Cited

UNITED STATES PATENTS

| | | | |
|---|---|---|---|
| 100,897 | 3/1870 | Hunt | 229—84 X |
| 1,062,851 | 5/1913 | Radcliff | 229—84 |
| 1,963,824 | 6/1934 | Cassedy | 47—41.13 |
| 2,337,525 | 12/1943 | Peik | 161—109 |
| 2,656,291 | 10/1953 | Doll et al. | |
| 3,016,131 | 1/1962 | Kennedy. | |
| 3,040,968 | 6/1962 | Long et al. | |
| 3,065,785 | 11/1962 | Taber | 161—109 |

ABRAHAM G. STONE, *Primary Examiner.*

P. A. RAZZANO, *Assistant Examiner.*